July 23, 1963  J. E. DUNNING  3,099,000
SIGNAL MONITOR

Filed May 20, 1959

INVENTOR
JOSEPH E. DUNNING
BY *Francis V. Giolma*
ATTORNEY

July 23, 1963     J. E. DUNNING     3,099,000
SIGNAL MONITOR

Filed May 20, 1959     2 Sheets-Sheet 2

United States Patent Office 3,099,000
Patented July 23, 1963

3,099,000
SIGNAL MONITOR
Joseph E. Dunning, Glen Aubrey, N.Y., assignor to International Business Machines Corporation, New York, N.Y., a corporation of New York
Filed May 20, 1959, Ser. No. 814,566
2 Claims. (Cl. 340—248)

This invention relates generally to signal monitors, and it has reference in particular to a double level signal monitor.

Heretofore, it has been known to monitor signal sources in computers and the like by means of an oscilloscope, for example, to determine departures in either of two directions from a predetermined operating level. Such means while readily detecting static or recurring errors is not entirely satisfactory in the case of intermittent or nonperiodic errors which do not in general last long enough for proper detection. In particular, such means are not too effective in the case of signal sources which have, for example, two different operating levels at which the signal may be at different timing intervals, both levels of which are normal operating conditions.

Generally stated it is an object of this invention to provide a signal level monitor to determine whether a signal is at either of two predetermined levels.

More specifically, it is an object of this invention to provide for using a transistor signal level monitor circuit to determine whether a signal is in either one of two predetermined operating zones.

Another object of the invention is to provide a signal monitor which is capable of monitoring a signal which changes from one level to another.

Yet another object of the present invention is to provide in a signal level monitor for permitting a signal to make a normal change from a predetermined normal up level to a predetermined normal down level without indicating an error condition.

It is also an object of the present invention to provide a semiconductor signal monitor for indicating whether the signal levels of a circuit under observation are outside a predetermined error zone.

Another important object of this invention is to provide a signal level monitor that will maintain an indication of a nonrecurring transient error condition.

A further object of the present invention is to provide a compact solid state signal level monitor which may be readily incorporated in the handle of a signal probe or the like.

Other objects of the invention will be pointed out in the following description and claims and illustrated in the accompanying drawings, which disclose, by way of examples, the principle of the invention and the best mode, which has been contemplated, of applying that principle.

Figure 1:
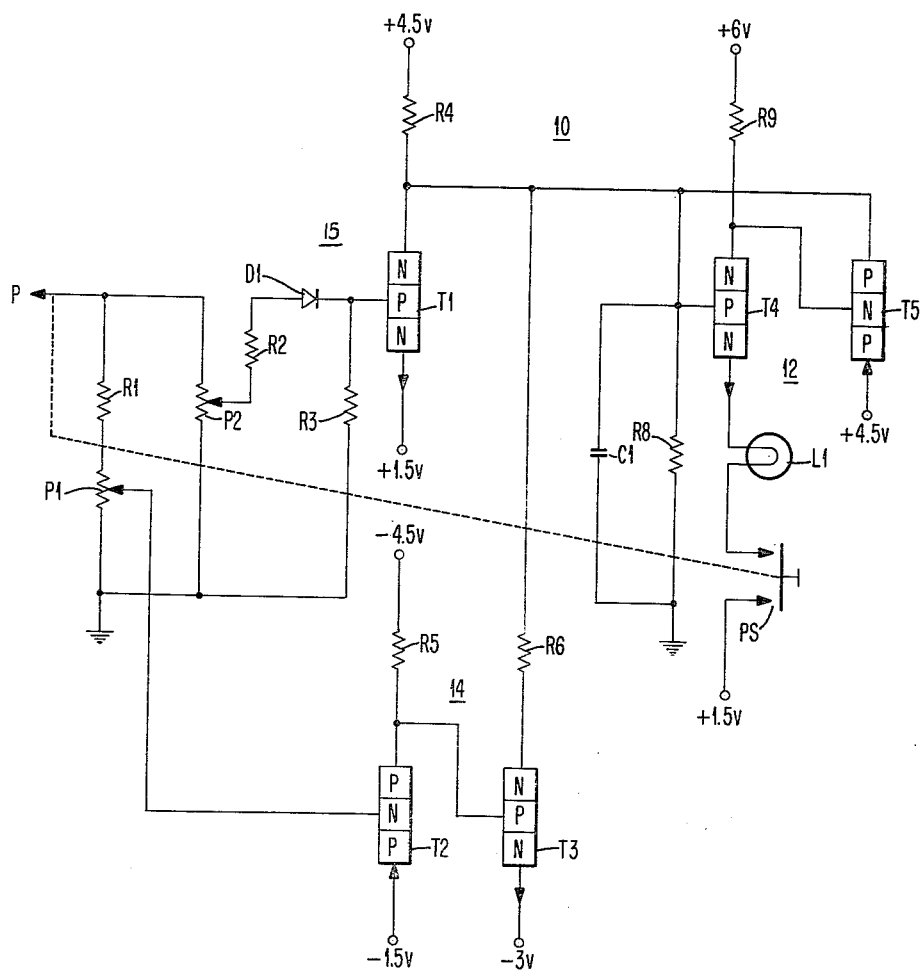
FIG. 1 is a schematic diagram of a signal level monitor embodying the principle of the invention in one of its forms.

Referring to FIG. 1 of the drawings, reference numeral 10 denotes generally a signal level monitor incorporating a bistable indicator circuit 12, a down level check circuit 14, and an up level check circuit 15. The indicator circuit 12 controls an error indicating light L1 under the control of the down level or up level check circuits, in response to signal voltages applied thereto by means of a probe P.

The error indicating lamp L1 is controlled by a transistor switch T4, which operates to connect the lamp between the +6 volt and +1½ volt terminals of a suitable direct current source through collector resistor R9 and a test switch PS which may be either manually operated or mechanically actuated by engagement of the test probe P with a terminal whose signal level is to be checked. A feed-back transistor T5 is connected between the base and collector of the switching transistor T4, and has its emitter connected to the +4½ volt terminal of the source, to maintain the transistor T4 conductive once it has switched, the base of the transistor T5 being connected to the collector of the transistor T4 to provide a feed-back circuit. If both transistor T4 and transistor T5 are cut off, the lamp L1 will be out.

If the voltage at the base of transistor T4 is raised to the point where transistor T4 conducts, the drop in the collector voltage of transistor T4 will turn on transistor T5. The feed-back from transistor T5 will keep transistor T4 conducting, even though the original input disappears. Since this indicator circuit operates like a thyratron, a very short duration positive pulse at the base of transistor T4 will cause the lamp L1 to be lighted, and it will remain lighted until one of the supply voltages is removed, such as by opening the test switch PS. An RC circuit comprising a resistor R8 and a capacitor C1 is connected between the base of transistor T4 and ground to provide a time delay in any change of base voltage so as to permit normal switching of a cathode follower being tested, from an up condition to a down condition, or vice versa, without effecting switching of the transistor T4 to indicate an error condition.

The down level check circuit 14 comprises a switching transistor T2 connected through a collector resistor R5 between the —4½ volt terminal and the —1½ volt terminal of the source. A phase inversion transistor T3 is connected through a collector resistor R6 between the base of transistor T4 and the —3 volt terminal of the source for effecting switching of transistor T4. The switching transistor T2 is controlled by being connected to the signal probe P through a voltage divider comprising an adjustable potentiometer P1 and a resistor R1, so that with —30 volts (if this is the lower threshold of error) applied to the probe P the potentiometer P1 may be adjusted so that the voltage at the base of transistor T2 is just sufficient to overcome the base-to-emitter bias of transistor T2. When transistor T2 conducts, its collector voltage increases to —1½ volts, which turns on transistor T3. With this adjustment of potentiometer P1, whenever voltage signal level at the probe P is above —30 volts, transitors T2 and T3 will be cut off.

The up level check circuit 15 comprises a switching transistor T1 which is connected through a collector resistor R4 between the +4.5 volt and the +1.5 volt terminal of the source. The up level is checked by connecting the base of transistor T1 to the probe P through a potentiometer P2 and a resistor R2, through a diode D1. With +5 volts applied to the probe P, the potentiometer P2 is adjusted so that the voltage at the base of transistor T1 is just sufficient to overcome the base-to-emitter bias of T1 (at this time transistors T2 and T3 are cut off). Now whenever the probe voltage goes below +5 volts, transistor T1 will be cut off.

Figure 2:
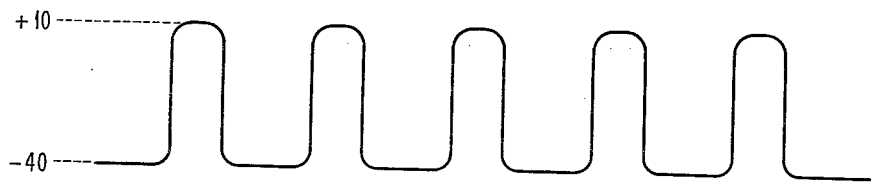
FIG. 2 is a normal characteristic curve of the output of a cathode follower such as may be monitored by the signal level monitor.
Figure 3:
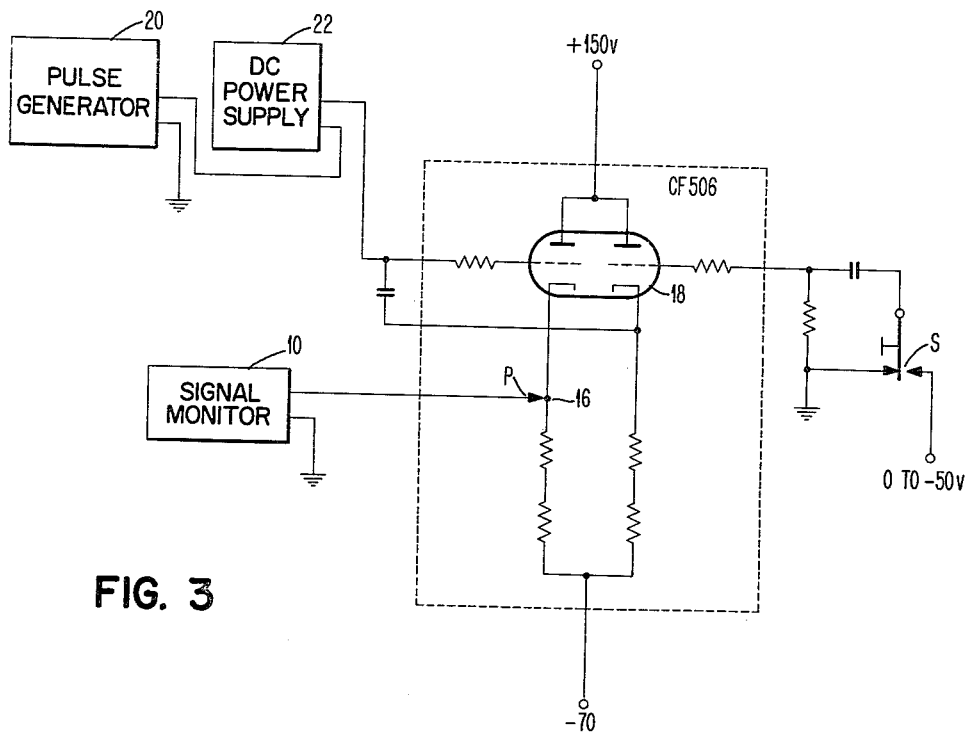
FIG. 3 is a schematic block diagram of the circuit illustrating an application of the signal level monitor.

Whenever transistor T1 and transistor T3 are cut off simultaneously (that is, whenever the probe voltage is between —30 volts and +5 volts), the voltage at the base of transistor T4 will be approximately +2 volts. This is sufficient to overcome the bias on transistor T4, and the indicator lamp L1 will be turned on, the test switch PS being closed by the application of the probe P to the terminal to be tested. Referring to FIG. 3, it will be seen that a signal level monitor 10 may be connected to the terminal 16 of a cathode follower CF506 which has an output characteristic similar to that shown in FIG. 2. The cathode follower is supplied with a grid signal from a pulse generator 20, superimposed on a direct current signal from a D.C. power supply 22. A switch S operable to selectively connect the cathode follower to a variable voltage source of from 0 to −50 volts for simulating an error condition by reducing or degrading the effects of the input pulses, permits the operator to readily ascertain that the level of the signal voltage at the terminal 16 is within range. However, if the up levels drop below +5 volts or the down levels exceed −30 volts, the lamp L1 of the signal monitor 10 is lighted. The capacitor C1 provides for holding the indicator off during normal switching time between the up and the down level, so that an error signal is not provided during a normal switching period.

From the above description and the accompanying drawings, it will be apparent that this invention provides a simple and effective signal level monitor which will readily indicate even an intermittent trouble condition. Such a monitor is relatively compact and may be readily incorporated in the handle of the probe. The operating condition of the lamp L1 may be readily tested by closing the test switch PS without any signal applied to P, whereupon the lamp should light if it is correct. The switch PS, while shown as normally open, may, if desired, be normally closed, in which case the operator should open it momentarily after the probe is applied to the terminal to be monitored.

In a typical embodiment of the invention, capacitor C1 has a value of 910 micro-microfarads, the diode D1 is of the type 1N119, the lamp L1 is a number 49, potentiometers P1 and P2 are 100K, resistor R1 is 160K, resistor R2 is 47K, resistor R3 is 100K, and resistors R4, R5, R6, R7 and R9 are 1.1K and resistor R8 is 2.2K. Transistors T1, T3 and T4 are the IBM type 58 while transistors T2 and T5 are of the IBM type 08.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a signal monitor, an indicator, a first transistor connected to effect energization of the indicator, a second transistor controlled by the said transistor connected to apply a feed-back signal to maintain said first transistor conductive, switch means connected in circuit with one of said transistors to interrupt the circuit thereof and turn the first transistor off, delay means for delaying operation of said transistor, a probe, circuit means connecting the probe and first transistor including a transistor switch normally turned on by a signal level above a predetermined zone of values, additional circuit means connecting the probe and first transistor including a transistor switch normally turned on by a signal level below said zone of values, said circuit means and additional circuit means operating to effect operation of said first transistor whenever the transistor switches of both circuit means are turned off.

2. In combination, an indicating device, means including a manual switch, a delay circuit, and a first semiconductor switch for connecting the indicating device to a source of electrical energy, an additional semiconductor switch activated by the first semiconductor switch to apply a feed-back signal thereto, a probe, control means including a semiconductor switch connected for controlling the first semiconductor in accordance with variations in a voltage signal from one voltage level, means including a voltage divider connecting the probe to said control means, additional control means including another semiconductor switch connected for controlling said first semiconductor switch in accordance with variations in the voltage signal from a different voltage level, and additional voltage divider means connecting said additional control means to the probe.

References Cited in the file of this patent

UNITED STATES PATENTS

| | | |
|---|---|---|
| 2,422,288 | Boynton | June 17, 1947 |
| 2,561,357 | Garfield | July 24, 1951 |
| 2,590,973 | Jordan | Apr. 1, 1952 |
| 2,637,018 | Hertog | Apr. 28, 1953 |
| 2,851,638 | Wittenberg et al. | Sept. 9, 1958 |
| 2,882,520 | Hass | Apr. 14, 1959 |
| 2,958,823 | Rabier | Nov. 1, 1960 |
| 2,995,687 | Mayberry | Aug. 8, 1961 |
| 3,021,514 | Regis et al. | Feb. 13, 1962 |

OTHER REFERENCES

"Control Engineering," Transistors: A New Class of Relays by R. B. Brown, et al., pp. 70 to 76, December 1956.